(12) United States Patent
Dobschal et al.

(10) Patent No.: US 8,456,744 B2
(45) Date of Patent: Jun. 4, 2013

(54) BEAM COMBINER FOR USE IN A HEAD-MOUNTED DISPLAY DEVICE AND BEAM SPLITTER

(75) Inventors: Hans-Juergen Dobschal, Kleinromstedt (DE); Guenter Rudolph, Jena (DE); Karsten Lindig, Erfurt (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/203,198

(22) PCT Filed: Feb. 25, 2010

(86) PCT No.: PCT/EP2010/052418
§ 371 (c)(1),
(2), (4) Date: Sep. 22, 2011

(87) PCT Pub. No.: WO2010/097439
PCT Pub. Date: Sep. 2, 2010

(65) Prior Publication Data
US 2012/0002294 A1      Jan. 5, 2012

(30) Foreign Application Priority Data

Feb. 25, 2009   (DE) .......................... 10 2009 010 537

(51) Int. Cl.
*G02B 27/14*     (2006.01)
*G09G 5/00*      (2006.01)
*G03B 21/00*     (2006.01)
*G02F 1/1335*    (2006.01)

(52) U.S. Cl.
USPC ................... 359/630; 345/7; 353/11; 349/11

(58) Field of Classification Search
USPC ....... 359/630–634, 13–14; 349/11; 310/49 R, 310/156.32, 156.33, 156.34, 156.35, 266–268, 310/156.02; 353/11–12, 28, 119; 340/438, 340/980, 995.1, 815.47, 815.74; 351/200, 351/205–206, 210, 221
See application file for complete search history.

(56) References Cited

U.S. PATENT DOCUMENTS 4,220,400 A * 9/1980 Vizenor ........................ 359/631
4,510,560 A   4/1985 Negishi
(Continued)

FOREIGN PATENT DOCUMENTS

DE          101 25 273          12/2002
DE      20 2006 014 814          1/2007
(Continued)

OTHER PUBLICATIONS

Application and File History for U.S. Appl. No. 13/203,203, filed Sep. 22, 2011, Inventors: Dobschal et al.

*Primary Examiner* — Dawayne A Pinkney
(74) *Attorney, Agent, or Firm* — Patterson Thuente Pedersen, P.A.

(57) ABSTRACT

A beam combiner for combining a first beam cluster with a second beam cluster that is not parallel to the first, to form a common beam cluster. The beam combiner includes a transparent body for the first beam cluster, which has a superimposition region that is encountered by the first beam cluster as it passes through the body. The superimposition region is split into a first section and a second section. Only the first section formed from interspaced reflective and/or refractive deflection elements causes a deflection of the second beam cluster by reflection and/or refraction, such that the first beam cluster forms the common beam cluster with the deflected second beam cluster once it has left the body.

32 Claims, 14 Drawing Sheets

U.S. PATENT DOCUMENTS

| | | | |
|---|---|---|---|
| 5,369,415 A | 11/1994 | Richard et al. | |
| 6,124,989 A | 9/2000 | Oode | |
| 6,204,974 B1 | 3/2001 | Spitzer | |
| 6,825,987 B2 | 11/2004 | Repetto | |
| 6,924,943 B2 | 8/2005 | Minano | |
| 6,989,929 B2 | 1/2006 | Watanabe | |
| 7,178,947 B2 | 2/2007 | Marks | |
| 7,577,326 B2 | 8/2009 | Amitai | |
| 7,656,585 B1 * | 2/2010 | Powell et al. | 359/630 |
| 2001/0024329 A1 | 9/2001 | Dreistein | |
| 2002/0186179 A1 | 12/2002 | Knowles | |
| 2003/0053206 A1 | 3/2003 | Togino | |
| 2004/0085649 A1 | 5/2004 | Repetto et al. | |
| 2007/0008624 A1 | 1/2007 | Hirayama | |
| 2007/0109619 A1 | 5/2007 | Eberl et al. | |
| 2007/0285773 A1 | 12/2007 | Ogawa | |
| 2008/0151379 A1 | 6/2008 | Amitai | |
| 2009/0213608 A1 | 8/2009 | Mozaffari | |

FOREIGN PATENT DOCUMENTS

| | | |
|---|---|---|
| DE | 10 2005 039 808 | 3/2007 |
| DE | 10 2008 049 407 | 4/2010 |
| EP | 0 635 745 A1 | 1/1995 |
| EP | 1 385 023 B1 | 11/2004 |
| WO | WO 2004/109349 | 12/2004 |
| WO | WO 2008/070431 | 6/2008 |
| WO | WO 2008/089992 | 7/2009 |
| WO | WO 2010/034639 | 4/2010 |

* cited by examiner

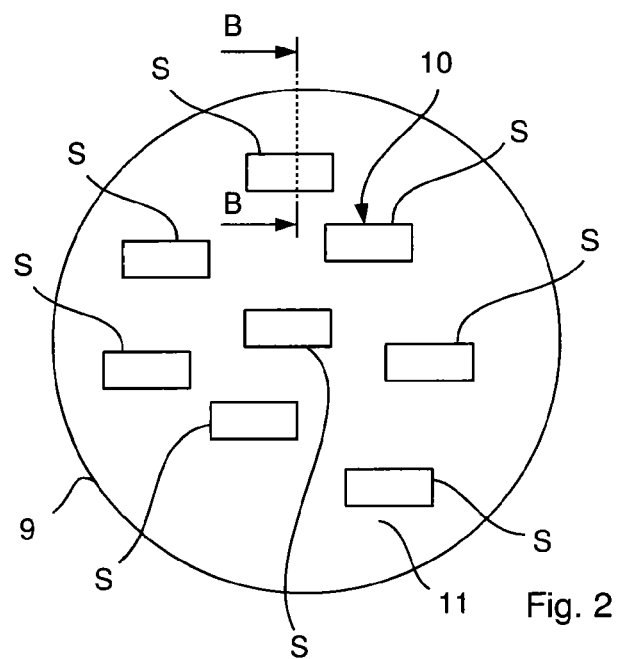
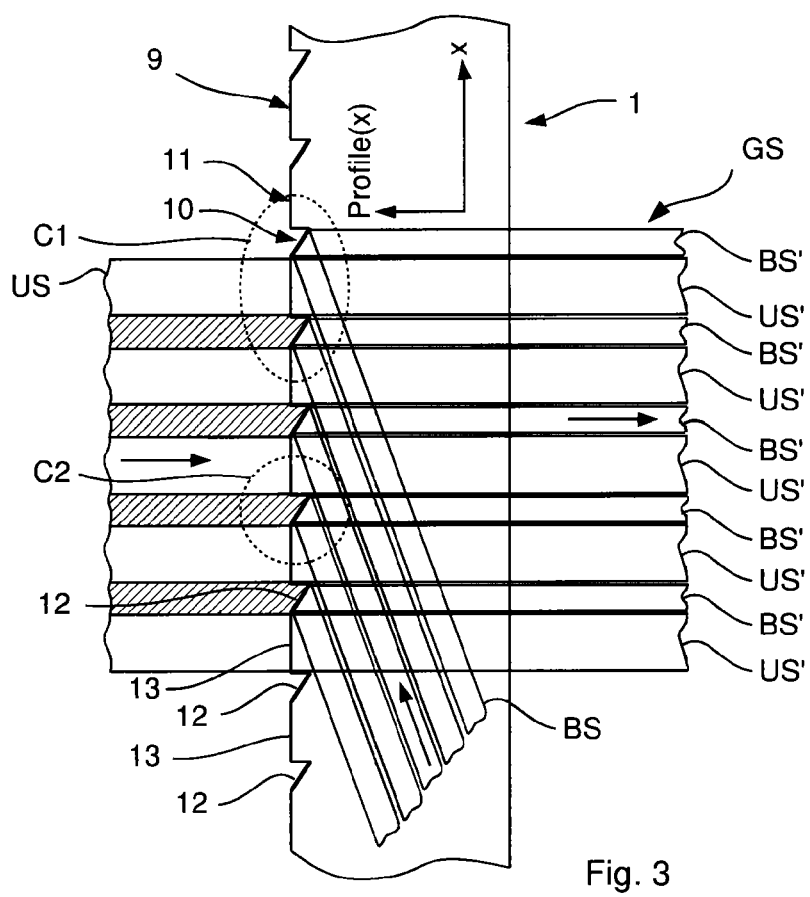

BEAM COMBINER FOR USE IN A HEAD-MOUNTED DISPLAY DEVICE AND BEAM SPLITTER

PRIORITY CLAIM

The present application is a National Phase entry of PCT Application No. PCT/EP2010/052418, filed Feb. 25, 2010, which claims priority from German Application Number 102009010537.9, filed Feb. 25, 2009, the disclosures of which are hereby incorporated by reference herein in their entirety.

FIELD OF THE INVENTION

The present invention relates to a beam combiner and a beam splitter.

BACKGROUND

A beam combiner is needed e.g. in a display device that can be fitted onto the head of a user, in order to be able to present to the user a generated image superimposed on the perceptible surroundings. The beam combiner is often formed as a curved spectacle lens in this case.

It is known to realize a beam combining through a semi-transparent mirror. However, the production technique is difficult, in particular if the light of the generated image is guided in the glass and the glass is curved.

Furthermore, a beam combining can be effected by means of an optical grating. However, this often disadvantageously involves undesired scattered light due to additional diffraction orders. Furthermore, such a grating is often only very narrow-band, with the result that the generated image can be only monochrome.

SUMMARY OF THE INVENTION

Starting from this, the object of the invention is to provide an improved beam combiner as well as an improved beam splitter.

According to the invention, the object is achieved by a beam combiner for combining a first ray beam with a second ray beam that does not run parallel to it to form a common ray beam, with a body that is transparent for the first ray beam and which has a superimposition area which the first ray beam strikes when passing through the body and which is divided into a first section and a second section, wherein only the first section, which is formed from a plurality of reflective and/or refractive deflecting elements spaced apart from each other, brings about a deflection of the second ray beam by reflection and/or refraction such that after leaving the body the first ray beam, together with the deflected second ray beam, forms the common ray beam.

Because of the deflecting elements which act reflectively and/or refractively, a beam combining can be realized for large wavelength ranges (in particular compared with conventional beam combiners by means of diffraction gratings).

The first section can have an imaging function for the second ray beam. Thus, not only is a desired beam combining carried out, but also equally imaging properties are realized by means of the first section. The imaging property of the first section can correspond to an imaginary optical effective surface which is curved and preferably has no mirror and rotational symmetry. The effective surface can also have no translational symmetry. Of course, it is also possible that the imaginary optical effective surface is rotationally symmetric (e.g. rotational asphere) or toric.

In particular, the surface of the first section, seen in top view onto the superimposition area, can preferably be 5 to 30% of the surface of the superimposition area. The proportion of the first section relative to the superimposition area can, however, also be 50% or more.

The deflecting elements can be formed at a material boundary surface (which can be flat or curved) of the body. A particularly simple manufacture is thus possible, e.g. by means of diamond milling. Furthermore, a production by moulding and casting methods is possible.

Each deflecting element can be formed flat. However, a curved formation of the individual deflecting elements is also possible.

In particular, all the deflecting elements can be formed identical. Alternatively, the formation of the deflecting elements can vary.

The deflecting elements are preferably irregularly distributed in the superimposition area, can be formed polygonal and/or have a maximum extent in the range of preferably 20-30 μm. The maximum extent can, however, also be 200 μm or 100 μm.

The beam combiner can be formed such that the part of the ray beam which strikes the first section is screened and thus does not become part of the common ray beam. Alternatively, it is also possible that the first section is transmissive for the first ray beam.

The first section can be formed in the manner of a discontinuous Fresnel structure. The Fresnel structure can have an imaging property that corresponds to the imaginary optical effective surface.

The reflective formation of the deflecting elements can be achieved by a reflective coating. The reflective coating can result in a complete reflection or also in a partial reflection. Furthermore, it is possible to realize the reflective action by total internal reflection. In this case, no reflective coating is needed.

The beam combiner can be formed in particular such that the second ray beam is guided in the transparent body to the superimposition area. This can take place for example by reflections at the material boundary surfaces. In particular, these can be total internal reflections.

Furthermore, in the case of the beam combiner according to the invention, the second section of the superimposition area can transmit the first ray beam.

The beam combiner can be used in a display device which has an image-generating module and a holding device that can be fitted onto the head of a user, wherein the beam combiner is attached to the holding device such that when the holding device is fitted a user can perceive the real surroundings through the superimposition area of the beam combiner, wherein the image-generating module generates an image and directs it as second ray beam onto the superimposition area such that when the holding device is fitted onto the head the user can perceive the image superimposed on the real surroundings.

In particular, the present invention also comprises such a display device with a beam combiner according to the invention. The display device can be called an HMD (Head-Mounted-Display) device. The display device can comprise further elements known to a person skilled in the art for the operation of the display device.

The display device can have e.g. the beam combiner according to the invention (optionally in one of its developments), an image-generating module and a holding device that can be fitted onto the head of a user and to which the beam combiner is attached such that when the holding device is fitted its user can perceive the real surroundings through the superimposition area of the beam combiner, wherein the image-generating module generates an image and directs it as second ray beam onto the superimposition area such that when the holding device is fitted onto the head the user can perceive the image superimposed on the real surroundings.

The beam combiner can have in particular an imaging property for the second ray beam.

Furthermore, the beam combiner can have a coupling-in area via which the second ray beam is coupled into the beam combiner and then guided in the beam combiner (for example by means of total internal reflections) to the superimposition area, wherein the coupling-in area is formed as a Fresnel surface which brings about a folding of the beam path.

The Fresnel surface preferably has an imaging property for the second ray beam. In particular, the Fresnel surface and/or the superimposition area can be formed at a curved material boundary surface of the beam combiner.

The Fresnel surface can be developed in particular in the same manner as the superimposition area of the beam combiner.

The beam combiner according to the invention can also be integrated for example in a helmet visor, in order that e.g. information can be projected to the wearer of the helmet via the superimposition area. Other applications of the beam combiner according to the invention are also possible. Thus, for example a window glass pane can be formed accordingly, in order to enable a projection of information in the manner according to the invention.

A beam splitter is furthermore provided for dividing a ray beam incident on the beam splitter into a first ray beam and a second ray beam that does not run parallel to it, wherein the beam splitter comprises a body that is transparent for the incident ray beam and which has a division area which the incident ray beam strikes and which is divided into a first section with a plurality of reflective and/or refractive deflecting elements spaced apart from each other and a second section, wherein the part of the incident ray beam transmitted by the division area forms the first ray beam and the part of the incident ray beam deflected at the deflecting elements by reflection and/or refraction forms the second ray beam. A division even of a very wide-band incident ray beam is possible with this beam splitter.

The deflecting elements can have an imaging function for the second ray beam, be formed flat or curved, be irregularly distributed over the division area and/or formed polygonal. The extent of each deflecting element can preferably lie in the range of 20-30 μm (but a maximum extent of up to 100 μm or up to 200 μm is also possible) and the surface of the first section can, seen in top view onto the division area, preferably lie in the range of 5-30% (however, 50% and more is also possible) of the surface of the division area.

The first section can be formed in the manner of a discontinuous Fresnel structure.

Furthermore, the beam splitter according to the invention can be developed in the same manner as the beam combiner according to the invention.

When the beam combiner according to the invention or the beam splitter according to the invention is used in an optical device, the superimposition area or the division area is preferably arranged, as far as possible, in a pupil of the optical system or as close as possible to a pupil of the optical system.

It is understood that the features mentioned above and those yet to be explained in the following are applicable, not only in the given combinations, but also in other combinations or singly, without departure from the scope of the present invention.

BRIEF DESCRIPTION OF THE DRAWINGS

The invention is explained in further detail below by way of example using the attached drawings which also disclose features essential to the invention. There are shown in:

FIG. 2 is a top view onto the superimposition area 9 of the beam combiner 1 from FIG. 1;

FIG. 3 is an enlarged sectional view along the section line B-B in FIG. 2;

DETAILED DESCRIPTION

Figure 1:
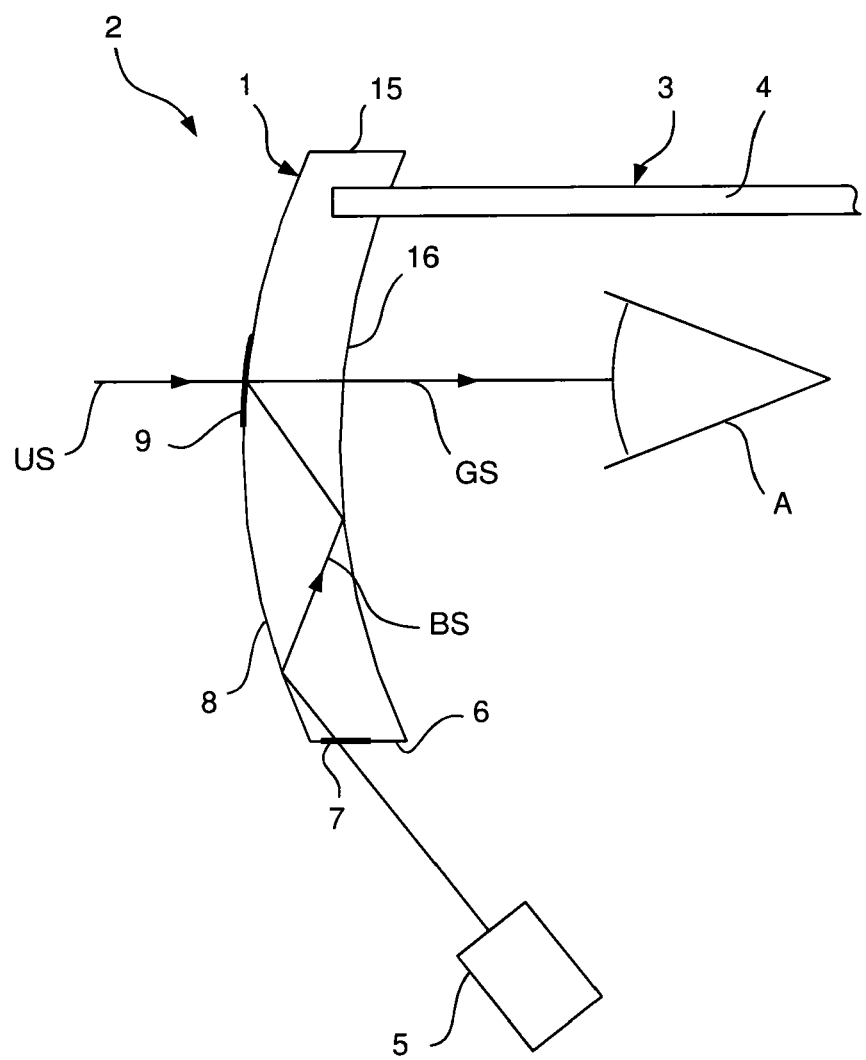
FIG. 1 is a schematic view of a display device with a beam combiner according to the invention.

In the embodiment shown in FIGS. 1 to 3, the beam combiner 1 according to the invention is formed as a multifunction glass of a display device 2 which comprises a holding device 3 that can be fitted onto the head of a user in the form of a glasses frame, wherein only one side arm 4 is drawn in schematically in FIG. 1.

The beam combiner 1 is attached to the holding device 3 such that when the holding device 3 is fitted onto the head it is arranged in the manner of a glasses lens in front of an eye A of the user. The user can perceive the surroundings through the beam combiner 1.

The display device 2 furthermore comprises an image-generating module 5 with which an image is generated which is presented to the user of the display device 2 superimposed on the surroundings perceptible for the user through the multifunction glass 1 when the user is wearing the display device on his head.

For this, the multifunction glass 1 has a coupling-in section 7 on its underside 6 and a superimposition area 9 on its front 8. As will be described in detail below, the superimposition area 9 transmits surrounding light US, without deflecting it. Furthermore, the superimposition area 9 directs light BS coming from the image-generating module 5 which is coupled via the coupling-in section 7 into the multifunction glass 1 and is guided in the latter by total internal reflection to the superimposition area 9, in the direction of the eye A of the user such that the user can perceive the generated image as a virtual image superimposed on the surroundings.

As can be seen in particular from the top view in FIG. 2, the superimposition area 9 is formed substantially circular and is divided into a first section 10 and a second section 11, wherein the first section 10 serves to deflect the image ray beam BS coming from the image-generating module 5 and the second section 11 serves to transmit the surrounding ray beam US coming from the surroundings. The superimposition area 9 has a plurality of sub-sections S spaced apart from each other which are distributed at random in the superimposition area 9 in the embodiment described here.

As can be seen from the enlarged sectional representation along the line B-B of one of the sub-sections S in FIG. 3, each sub-section S has a plurality of deflecting mirrors 12 spaced apart from each other which here extend perpendicular to the plane of drawing of FIG. 3.

The areas between the deflecting mirrors 12 in the sub-sections S as well as the remaining areas of the superimposition area 9 alongside the sub-sections S together form the second section 11. The first section 10 is formed of the deflecting mirrors 12.

As can furthermore be seen from FIG. 3, the superimposition area 9 and thus also the deflecting mirrors 12 are formed on the front 8 of the multifunction glass 1. Although the front 8 is curved, the curvature is not shown in FIG. 3, to simplify the representation. The deflecting mirrors 12 are tilted relative to the normal of the front 8 such that the part of the image ray beam BS which strikes the respective deflecting mirror 12 is deflected towards the eye A as image partial beam BS'. The remaining part of the image ray beam BS which does not strike the deflecting mirrors 12 is reflected and/or transmitted at the front 8 such that it is not perceptible for the user.

The part of the surrounding ray beam US which strikes the backs of the deflecting mirrors 12 (from the left in FIG. 3) is screened by the deflecting mirrors 12 such that the user cannot perceive this part. This part is therefore drawn in hatched in FIG. 3. The remaining part of the surrounding ray beam US passes as surrounding partial beams US' through the transmissive areas 13 between or alongside the deflecting mirrors 12.

The superimposition area 9 thus brings about a superimposition of the part US' of the surrounding ray beam US passing through the transmissive areas 13 which form the second section 11 with the part BS' of the image ray beam BS reflected at the deflecting mirrors 12 to form a common ray beam GS. The user wearing the display device 2 on his head can thereby perceive the image generated by means of the image-generating module 5 superimposed on the surroundings.

In the schematic representation of FIG. 3, the beams BS' and US' run parallel to each other. However, this need not be the case. Thus, a "through-mixing" of the beams BS' and US' takes place e.g. because of the curvature of the front.

The thus-formed beam combiner 1 has the advantage that it is very broad band compared with previous diffractive solutions.

The individual deflecting mirrors 12 may be arranged distributed irregularly over the superimposition area 9, as is the case here on the basis of the sub-sections S distributed at random in the superimposition area 9. Of course, e.g. the distance between neighbouring deflecting mirrors 12 can also vary. Any other distribution of the deflecting mirrors 12 in the superimposition area 9 is also possible. The surface portion of the deflecting mirrors 12 relative to the whole surface of the superimposition area 9, seen in top view onto the superimposition area 9, can lie e.g. in the range of 5-30%.

Figure 4:
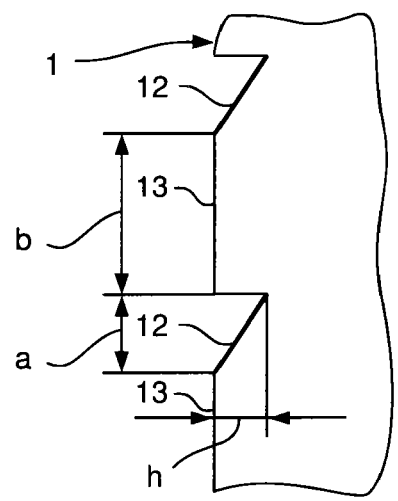
FIG. 4 is an enlarged view of the detail C1 from FIG. 3.

Of course, it is also possible that deflecting mirrors 12 are provided in the whole superimposition area. In this case, the surface proportion given above can be achieved if the b/a ratio lies in the range of from 3:1 to 20:1 (FIG. 4). In all the described embodiments, the height h in one example lies in the range of 5-500 μm, in another example, in the range of 0.01-0.1 mm. A range of 0.05-0.3 mm and a range of 200-300 μm are used on other embodiments. A size of for example 20-30 μm has proved to be very advantageous for the parameter a.

The first section 10 in FIG. 2 can also be called a discontinuous Fresnel structure, because of the deflecting mirrors 12 arranged distributed on the basis of the distributed sub-sections. This Fresnel structure can be determined as follows. The initial assumption is the general surface function f(x,y) given below.

$$f(x, y) = \sum_{i=0}^{N} \sum_{j=0}^{N} (c_{i,j} x^i y^j) \tag{1}$$

The surface function f(x,y) can in particular describe a curved surface. The curved surface can be formed rotationally symmetrical. For example, the surface function can describe a rotational asphere. However, it is also possible that it describes a surface which is curved and has no mirror and rotational symmetry. Such a surface can also be called a free-form surface. The free-form surface can preferably have no translational symmetry.

By predetermining a maximum groove depth h (here e.g. between 0.01 and 0.1 mm), the following actual profile function can be deduced as profile height taking into account the height z(x,y) of the front 8 of the multifunction glass.

$$\text{Profile} = z(x,y) - \text{modulo}(f(x,y),h) \quad (2)$$

Figure 5:
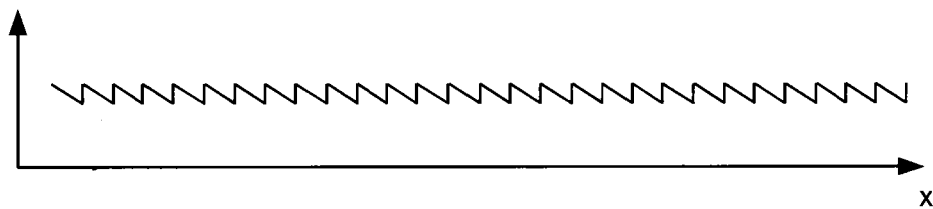
FIG. 5 is a schematic view to illustrate the arrangement of the deflecting elements.

Here, modulo(f(x,y),h) describes the respective Fresnel proportion which increases from 0 to h and then drops back to 0 in one step. Thus, modulo(f(x,y),h) describes a triangular function for a right-angled triangle. The following continuous profile function, such as is shown schematically in FIG. 5, is thus obtained.

Figure 6:
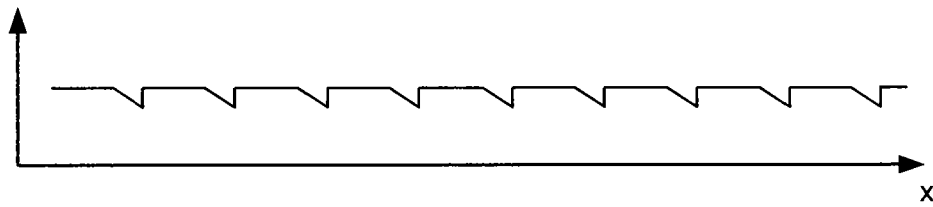
FIG. 6 is a further schematic view to illustrate the arrangement of the deflecting elements.

Depending on the desired surface ratio of deflecting mirrors 12 to the whole superimposition area and the size and number of the sub-sections S, areas or sections of this profile function are substituted by the spherical radius of the front 8 of the multifunction glass, with the result that the Fresnel structure shown below in FIG. 6 results. Because of the schematic representation of only a small section of the front 8, the spherical curvature of the front cannot be seen in this representation.

In the embodiment example described here, the following polynomial coefficients were used, wherein the first figure with the coefficient c stands in each case for the power x and the second figure for the power y, with the result that e.g. c21 is the coefficient before xxy. Any coefficients c not listed are 0.

| | |
|---|---|
| c10 | 3.09E−02 |
| c01 | −5.69E−01 |
| c11 | −1.00E−04 |
| c21 | 2.71E−05 |
| c12 | 1.34E−05 |
| c22 | 2.57E−06 |
| c20 | 3.17E−03 |
| c02 | 2.44E−03 |
| c30 | 2.64E−05 |
| c03 | 2.23E−05 |

The radius of the glasses lens to which the Fresnel structure is applied is 105.08 mm here.

Figure 7:
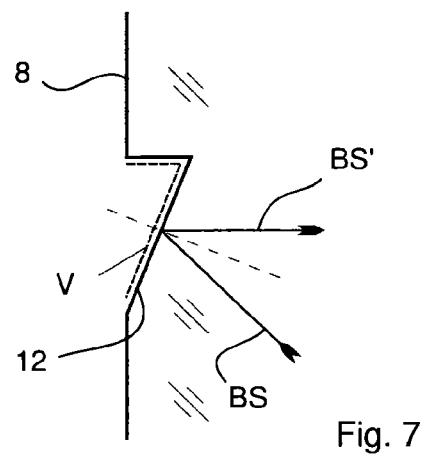
FIG. 7 is an enlarged view of the detail C2 from FIG. 3.

In the embodiment described, the deflecting mirrors 12 are formed by a metallization V of the inclined sections, as can be seen in the enlarged view of the detail C2 from FIG. 3 in FIG. 7.

Figure 8:
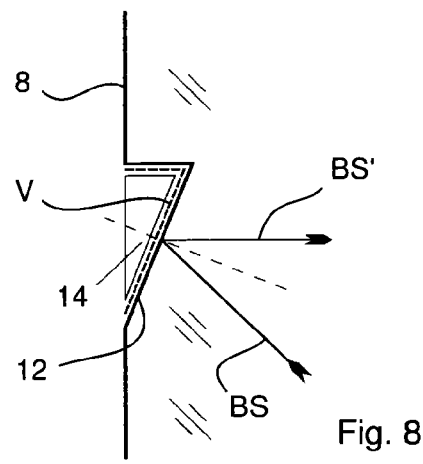
FIG. 8 is an enlarged view of the detail C2 from FIG. 3 according to a first variant.

In FIG. 8, a variant is shown in which the free area which is formed due to the incline of the deflecting mirror 12 relative to the front 8 of the multifunction glass 1 is filled to the front 8 with material 14. The filling is preferably carried out such that a smooth, continuous front 8 is formed. In particular, the same material as for the multifunction glass 1 itself can be used as material 14.

Figure 9:
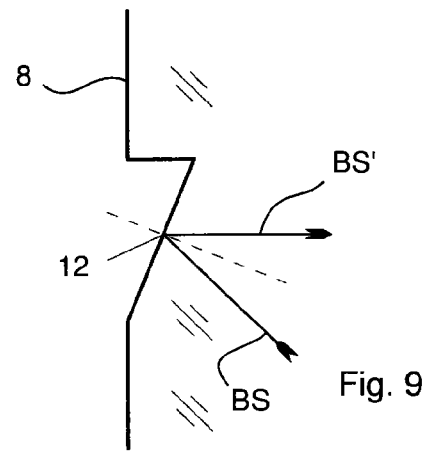
FIG. 9 is an enlarged view of the detail C2 from FIG. 3 according to a further variant.

However, it is also possible to design the beam combiner 1 such that the deflection of the image ray beam BS takes place by total internal reflection, with the result that a metallization is no longer necessary, as is shown in FIG. 9. In this case, the surrounding ray beam US is also transmitted by the deflecting elements 12.

Of course, it is also possible to provide the deflecting elements 12 with a partial metallization, with the result that they function both reflectively for the image ray beam BS and transmissively for the surrounding ray beam US.

Furthermore, it is possible to form refractive deflecting elements instead of reflective deflecting elements. In this case, the superimposition area 9 is preferably formed on the inside 16 of the multifunction glass 1.

Figure 10:
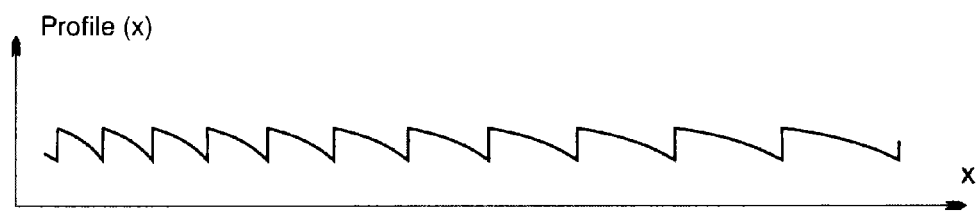
FIGS. 10-12 depict examples of further profile shapes for the deflecting elements 12.
Figure 11:
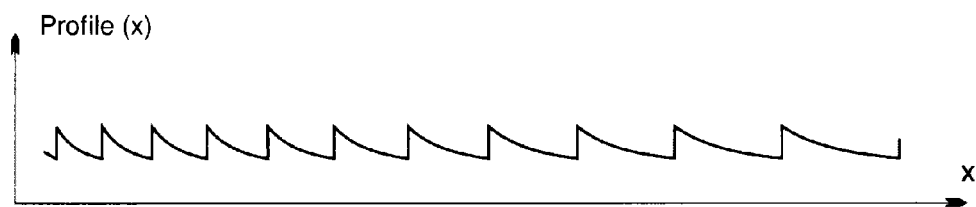

In the embodiments described thus far, the profile shape of the deflecting elements 12 in the sectional representations shown was always linear. However, other profile shapes are also possible. Thus, the edges can be curved convexly in cross-section, as is indicated in FIG. 10. The representation in FIG. 10, and also in FIGS. 11 and 12, corresponds to the representation from FIG. 5, with the result that, starting from this profile shape, the spherical radius is still to be provided in areas instead of the profile course shown, in order to then arrive at the desired profile course in the sub-sections S. A concave edge curvature, as is indicated in FIG. 11, can also be provided.

Figure 12:
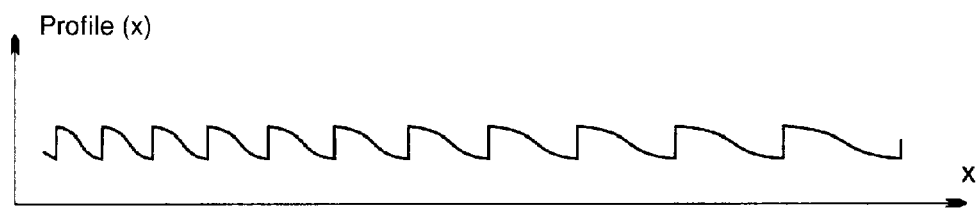

Any desired curvature can also be provided, as is indicated schematically in FIG. 12.

Figure 13:
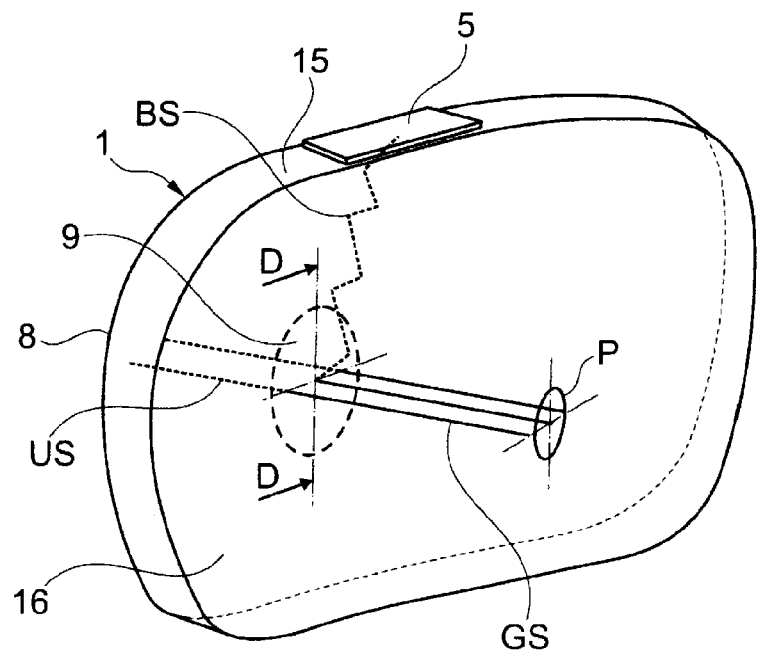
FIG. 13 is a perspective view of a development of the multifunction glass 1 from FIG. 1.

A variant of the multifunction glass 1 from FIG. 1 is shown in FIG. 13. In this variant, the image-generating module or the imaging system 5 is arranged at the upper rim 15. The image ray beam BS emitted by the imaging system 5 is guided in the glass 1 by total internal reflection at the front 8 as well as the back 16 of the glass 1 to the superimposition area 9 in which, in the same manner as in FIG. 2, a plurality of sub-sections S with the deflecting elements 12 are arranged.

Figure 14:
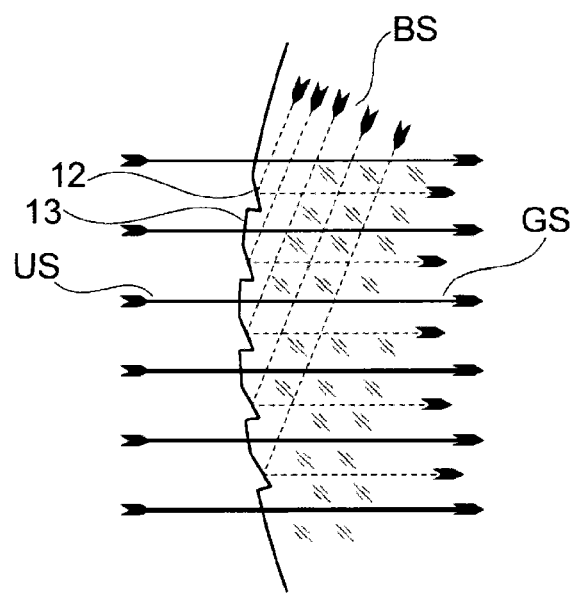
FIG. 14 is an enlarged sectional view along the section line D-D in FIG. 13.

In FIG. 14, a section through such a sub-section S along the line D-D is schematically represented enlarged. On the basis of the superimposition of the image ray beam BS and the surrounding ray beam US, the desired common ray beam GS is generated, with the result that a user who is wearing glasses with such a multifunction glass 1 with his eye A positioned in the pupil area P which is spaced apart from the back 16 can perceive the surroundings with the image generated by the imaging system 5 superimposed.

In the embodiment shown in FIGS. 13 and 14, as well as in all the embodiments described thus far, the superimposition area is formed in the front 8. The deflecting mirrors 12 are formed integrally in the front 8, with the result that the superimposition area 9 is part of the front 8 of the multifunction glass 1.

Figure 15:
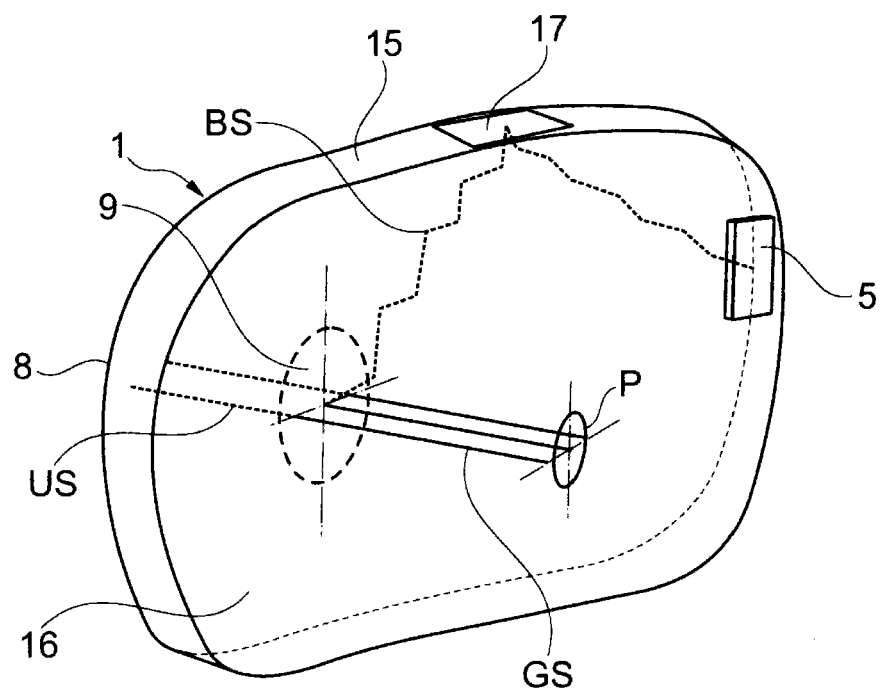
FIG. 15 is a perspective view of a further embodiment of the multifunction glass 1 from FIG. 1.

In FIG. 15, a further embodiment of the multifunction glass 1 is shown, wherein here, as also in the embodiments still to be described below, the same elements are given the same reference numbers and, to avoid unnecessary repetition, reference is made to the corresponding description above.

In the embodiment from FIG. 15, the imaging system 5 is arranged at the back 16 of the multifunction glass or spaced apart from the back 16, with the result that the image ray beam BS enters the glass 1 via the back 16. The image ray beam BS is then guided via total internal reflection at the front and back 8, 16 to an area 17 of the upper rim 15. The area 17 is metallized, with the result that the image ray beam BS is reflected in the direction of the superimposition area 9. Between the mirror area 17 and the superimposition area 9 the image ray beam BS is again guided by total internal reflection at the front and back 8, 16. The desired superimposition for generating the common ray beam GS takes place in the superimposition area 9.

The surface of the mirror area 17 which brings about the reflection can be plano. However, any desired curvature is also possible. In particular, it can be curved and have no rotational or mirror symmetry. Furthermore, it can preferably also have no translational symmetry.

Figure 16:
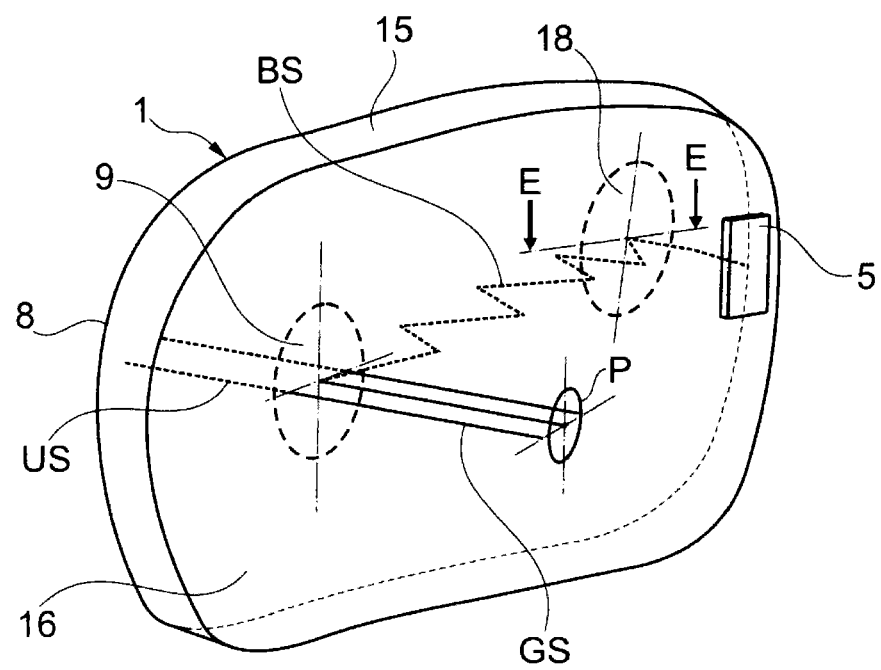
FIG. 16 is a perspective view of a further embodiment of the multifunction glass 1 from FIG. 1.
Figure 17A:
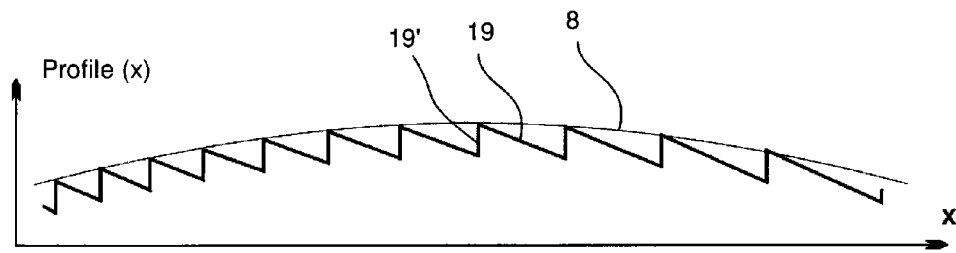
FIG. 17A is an enlarged sectional representation along the section line E-E in FIG. 16.

Although, in the embodiment from FIG. 16, the imaging system 5 is again arranged on the back or spaced apart from the latter, such that the image ray beam BS enters the multifunction glass 1 via the back 16, in the embodiment from FIG. 16, the image ray beam BS runs directly to the front 8 in which a deflecting area 18 is formed. This deflecting area 18 has a plurality of deflecting mirrors 19 arranged next to each other which can extend essentially parallel to each other. The deflecting mirrors 19 run from the top to the bottom in the representation from FIG. 16 and are tilted relative to the front 8. Unlike the deflecting mirrors 12 of the superimposition area, no spaces are provided between the individual deflecting mirrors 19, with the result that the deflecting area 18 can also be called a Fresnel area or Fresnel surface 18. The sectional view along the line E-E in FIG. 16 is shown in FIG. 17A. In cross-section, the deflecting mirrors 19 are linear and arranged at the curved base surface which here is the front 8 of the multifunction glass. The individual edges 19' which connect the deflecting mirrors to each other are aligned parallel to each other. The original course of the front 8 here is also drawn in schematically.

In a variant (not shown) of the multifunction glass 1 from FIG. 16, another Fresnel surface is provided on the front 8 or back 16 of the glass 1 between the deflecting area 18 and the superimposition area 9 for guiding the beam. This further Fresnel surface can be formed in the same manner as the deflecting area 18 or the superimposition area 9.

Figure 17B:
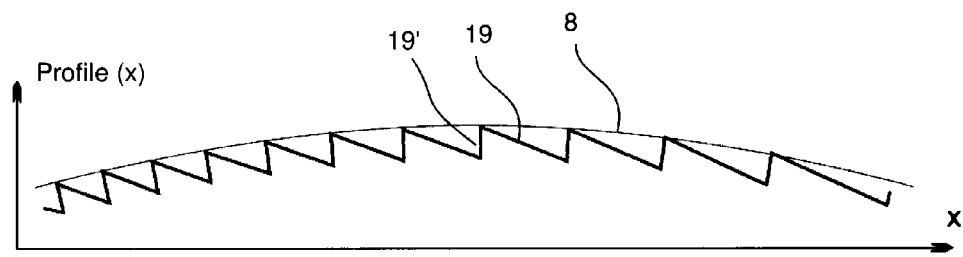
FIG. 17B is a variant of the sectional representation from FIG. 17A.

In FIG. 17B, a variant of the profile from FIG. 17A is shown which differs essentially in that the edges 19' which connect the deflecting mirrors 19 are no longer oriented parallel to each other in cross-section, but radially relative to the centre, not shown, of the front 8.

Figure 18A:
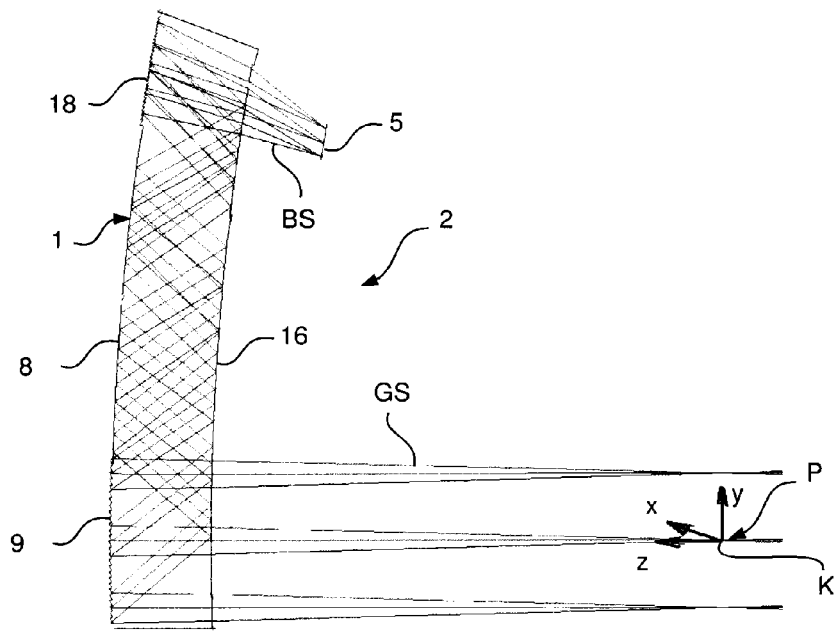
FIG. 18A is a schematic side view of a further embodiment of the display device 2 according to the invention.

In FIG. 18A, a schematic side view of a further embodiment of the display device 2 according to the invention is shown, wherein only the multifunction glass 1, the image-generating module 5, the eye position K and some examples of beam courses for the image ray beam BS and the common ray beam GS are drawn in. The corresponding perspective view of the display device 2 from FIG. 18A is represented in FIG. 18B.

Figure 18B:
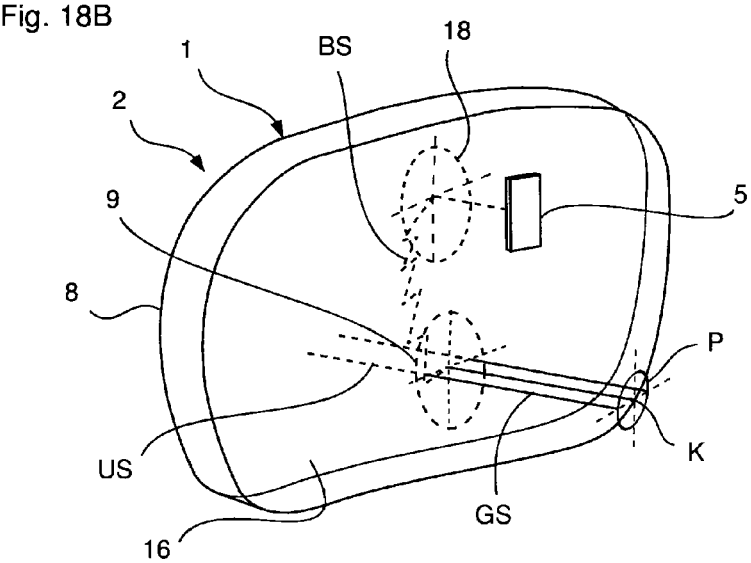
FIG. 18B is a perspective representation of the display device from FIG. 18A.

As can be seen from the representation in FIGS. 18A and 18B, unlike in the embodiment from FIG. 16, the deflecting area 18 is no longer arranged next to the superimposition area 9, but above the superimposition area 9.

The deflecting area 18 here is a coupling-in area or section via which the image of the image-generating module 5 is coupled into the multifunction glass 1 such that the image ray beam BS is guided to the superimposition or coupling-out area 9 by means of total internal reflections.

The multifunction glass 1 has a spherically curved, convex front 8 with a radius of 143.5 mm as well as a spherically curved, concave back 16 with a radius of curvature of 140.0 mm, wherein the thickness of the glasses lens is 3.5 mm and PMMA was used as material for the glasses lens.

The Fresnel structure of the deflecting area 18 can be given in the same manner as for the deflecting mirrors 12 according to the above Formula (2), wherein here the whole deflecting area 18 is formed as a continuous Fresnel surface (thus without a substitution of areas by the spherical front 8) and the following function is used as surface function f(x,y):

$$f(x, y) = \sum_{i=0}^{M} \sum_{j=0}^{N} (c_{k(i,j)} \cdot x^i \cdot y^j), \quad (3)$$

wherein k(i,j) is determined as follows $$k(i, j) = \frac{(i+j)^2 + i + 3 \cdot j}{2} + 1. \quad (4)$$

The depth of the Fresnel structure or the Fresnel crimping in z-direction and thus the value for Δh here is 0.1 mm and the Fresnel polynomial coefficients read as follows:

| i | j | k | Value |
|---|---|---|-------|
| 0 | 1 | 2 | 1.978676e+000 |
| 0 | 2 | 5 | −1.683682e−001 |
| 0 | 3 | 9 | 6.583886e−003 |
| 0 | 4 | 14 | −1.592897e−004 |
| 0 | 5 | 20 | 1.673948e−006 |
| 2 | 0 | 3 | −1.260064e−002 |
| 2 | 1 | 7 | −1.594787e−004 |
| 2 | 2 | 12 | 5.047552e−005 |
| 2 | 3 | 18 | −1.124591e−006 |
| 2 | 4 | 25 | −3.539047e−008 |
| 2 | 5 | 33 | 6.224301e−010 |
| 4 | 0 | 10 | 2.326468e−004 |
| 4 | 1 | 16 | −2.256722e−005 |
| 4 | 3 | 31 | 2.658107e−008 |

All unnamed coefficients k(i, j) which are not listed in the above table are equal to 0.

The Fresnel structure for the coupling-out area 9 can also be described by means of Formulae (2) to (4). The corresponding Fresnel polynomial coefficients are given in the following table, wherein again all unnamed coefficients k(i,j) which are not listed in the table are equal to 0.

| i | j | k | Value |
|---|---|---|-------|
| 0 | 1 | 2 | 3.889550e−001 |
| 0 | 2 | 5 | −3.833425e−003 |
| 0 | 3 | 9 | −2.736702e−007 |
| 0 | 4 | 14 | 1.935143e−006 |
| 0 | 5 | 20 | 9.627233e−007 |
| 2 | 0 | 3 | −5.487613e−003 |
| 2 | 1 | 7 | 5.506765e−005 |
| 2 | 2 | 12 | 1.146413e−006 |
| 2 | 3 | 18 | 2.124906e−006 |
| 2 | 4 | 25 | −7.838697e−008 |
| 2 | 5 | 33 | −7.841081e−008 |
| 4 | 0 | 10 | 4.996870e−008 |
| 4 | 1 | 16 | −5.316581e−007 |
| 4 | 3 | 31 | −2.683089e−008 |

Also in the case of the Fresnel structure of the coupling-out area or section 9, Δh is equal to 0.1 mm.

The position of the optical surfaces in the overall coordinate system of the pupil P of the eye A (the point of origin is at K) can be given as follows by reference to the direction of the coordinates x, y and z in FIG. 18A in each case relative to the surface in the immediately preceding row (the coordinates x, y and z drawn in FIG. 18A relate to the coordinate system of the pupil P which is used only for the description of the Fresnel structures of the coupling-in and coupling-out areas 18 and 9 in connection with FIG. 18A):

| Surface | x-coordinate [mm] | z-coordinate [mm] | Tilt angle about x-axis (°) |
|---|---|---|---|
| P | 0.000 | 0.000 | 0.000 |
| 9 | 0.000 | 21.500 | 0.000 |
| 18 | 0.000 | 0.000 | 0.000 |
| 5 | 0.000 | 16.828 | 14.042 |

In the case of the coupling-in and coupling-out areas 18 and 9, the position of the coordinate system is given, with regard to which the Fresnel surface is defined in the manner given above. In each case, values of 0 are therefore given for the surface 18, as the coordinate systems for the surfaces 9 and 18 coincide. The position and size of the used aperture surface of the respective Fresnel surface, which corresponds to the coupling-in section 18 and to the coupling-out section 9, are as follows with regard to the coordinate system peculiar to the surface:

| Element | x-coordinate [mm] | y-coordinate [mm] | APX [mm] | APY [mm] |
|---|---|---|---|---|
| 9 | 0.000 | 0.000 | 14.5 | 7.1 |
| 18 | 0.000 | 19.87 | 11.6 | 4.8 |

In this table, the width of the Fresnel structure in x-direction is given in the APX column and the width of the Fresnel structure in y-direction in the APY column. Furthermore, the distance of the coupling-out section 9 from the coupling-in section 18 is given. The distance from the eye pupil P to the glasses lens (back 16) here is 18 mm, wherein the field of vision is 20 ×4° for a diameter of 6 mm.

Figure 18C:
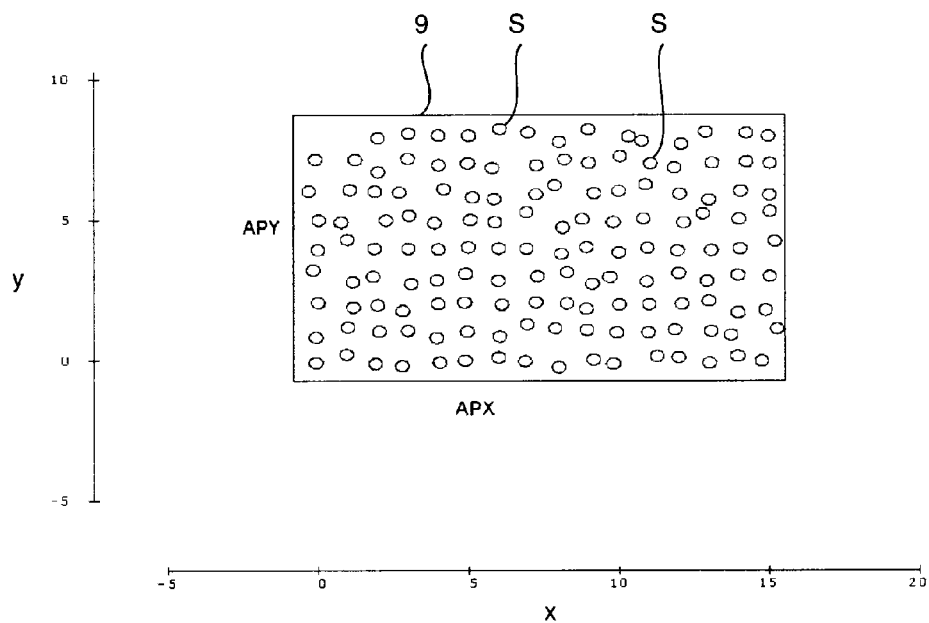
FIG. 18C is a top view of the superimposition area 9 of the multifunction glass 1 from FIGS. 18A and 18B.

In order to avoid a regular arrangement or structure of the Fresnel sections in the case of the coupling-out area 9, they can be arranged e.g. only in the rectangular sub-sections S (FIG. 2). The sub-sections S can also be circular, as is shown in the schematic top view onto the, for example rectangular, coupling-out area 9 in FIG. 18C and which is assumed for the following description. Circular areas are fixed, the diameter of which can be determined as follows $$D=\sqrt{(100-T)/100}/\pi \cdot 2 \cdot APX/N$$

Wherein T is the required transmission for the surrounding light in percent, N the number of the circles in x-direction and APX the aperture width in x-direction. The circles are initially arranged equidistant in a fixed grid with a grid spacing APX/N in x and y. The positions of the centres of the circles are then easily modified, by dicing the direction and length of the shift of the centres. The length is chosen here such that no overlapping effect occurs between neighbouring circles.

The following formulae can be applied as statistical functions for length and angle.

Statistical displacement length:

$$r=(APX/N/2-D/2) \cdot randf$$

Statistical displacement direction:

$$w=360 \cdot randf$$

Wherein randf provides a random value between 0 and 1. The modified position of the circles then results according to the following formulae:

$$x=(i/N) \cdot APX+r \cdot \cos(w)$$

$$y=(j/N) \cdot APX+r \cdot \sin(w)$$

$$M=\text{round}(APY/APX)$$

Wherein the round function rounds the criterion (APY/APX) up to whole numbers.

Of course, any other type of distribution of the Fresnel structure can also be chosen, wherein an irregular arrangement is preferably chosen.

Figure 18D:
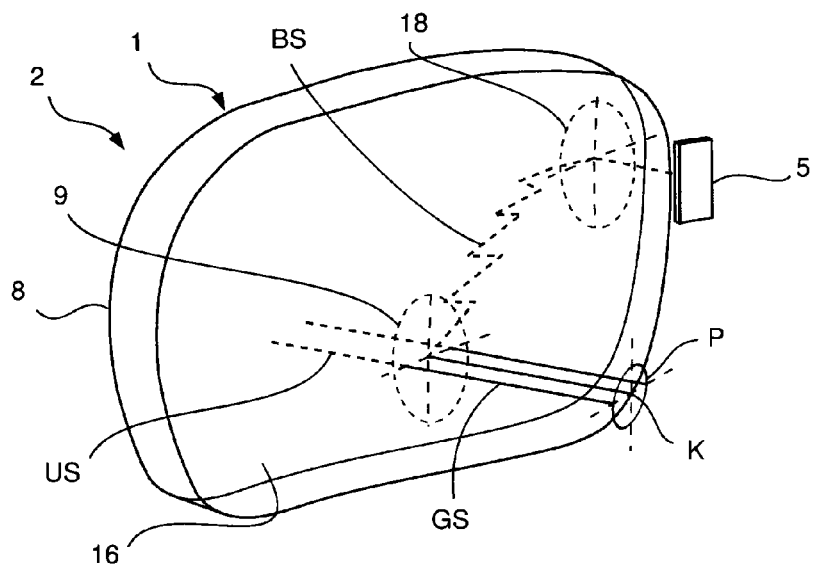
FIG. 18D is a perspective representation of a further embodiment of the display device 2 according to the invention.
Figure 18E:
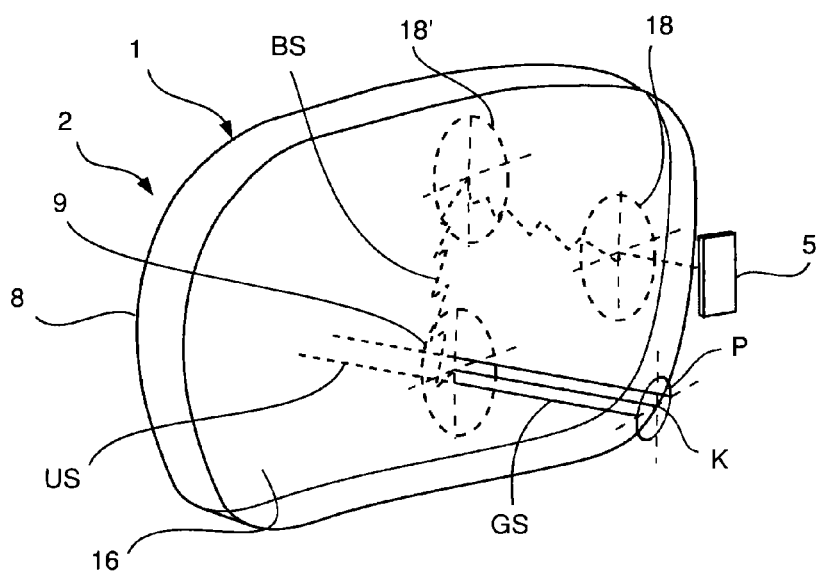
FIG. 18E is a perspective representation of a further embodiment of the display device 2 according to the invention.

Variants of the display device 2 according to FIGS. 18A and 18B are shown in FIGS. 18D and 18E. In the embodiment from FIG. 18D, the coupling-in section 18 is offset both laterally and vertically to the coupling-out section 9. In the embodiment from FIG. 18E, a deflecting section 18' which can be formed in the same manner as the coupling-in section 18 as a Fresnel structure (here as a reflective Fresnel structure) is formed on the front 8 between the coupling-in and the coupling-out section 18 and 9. In particular, the deflecting section 18' can, in addition to the folding of the beam path brought about by it, also have another imaging property (in an identical or similar manner to the coupling-in section 18 and optionally the coupling-out section 9).

The formation of the coupling-in and coupling-out sections 18 and 9 as well as optionally the deflecting section 18' on the same side of the multifunction glass (here on the front 8) facilitates the production of the multifunction glass 1.

Figure 19:
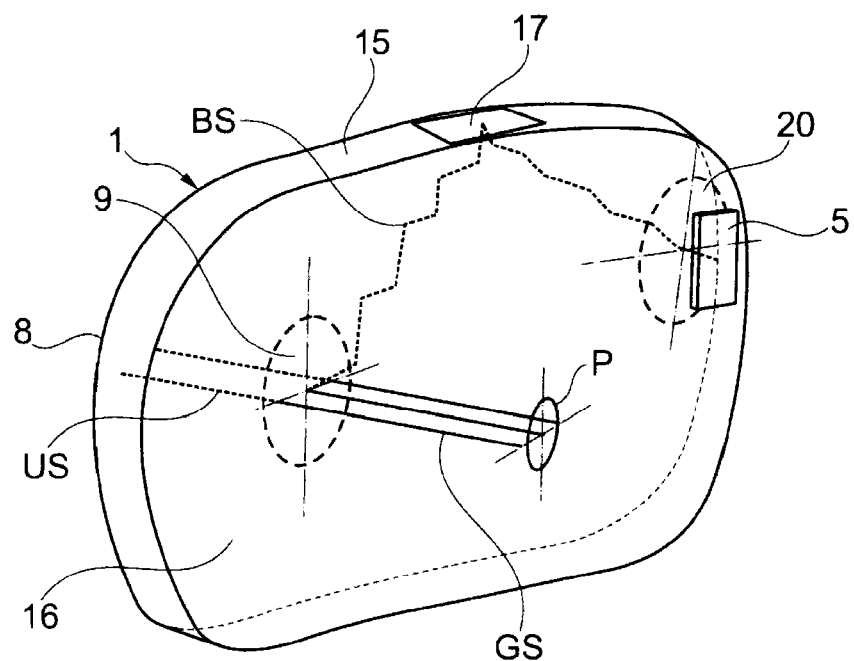
FIG. 19 is a perspective view of a further embodiment of the multifunction glass 1 from FIG. 1.

A further variant of the multifunction glass 1 is shown in FIG. 19. The image ray beam BS again enters the multifunction glass 1 from the back 16, and is reflected at the front 8 by a Fresnel surface 20 in the direction of the upper rim 15. The Fresnel surface 20 is in principle constructed in the same way as the Fresnel surface 18 in FIG. 16. The alignment of the tilting of the deflecting mirrors of the Fresnel surface 20 is merely chosen such that the deflection shown in FIG. 19 takes place. After being deflected at the Fresnel surface 20, the image ray beam BS is guided by means of total internal reflection at the back and front 16, 8 to the mirror area 17, reflected there and again guided by means of total internal reflection between the front and back 8, 16 to the superimposition area 9.

Figure 20:
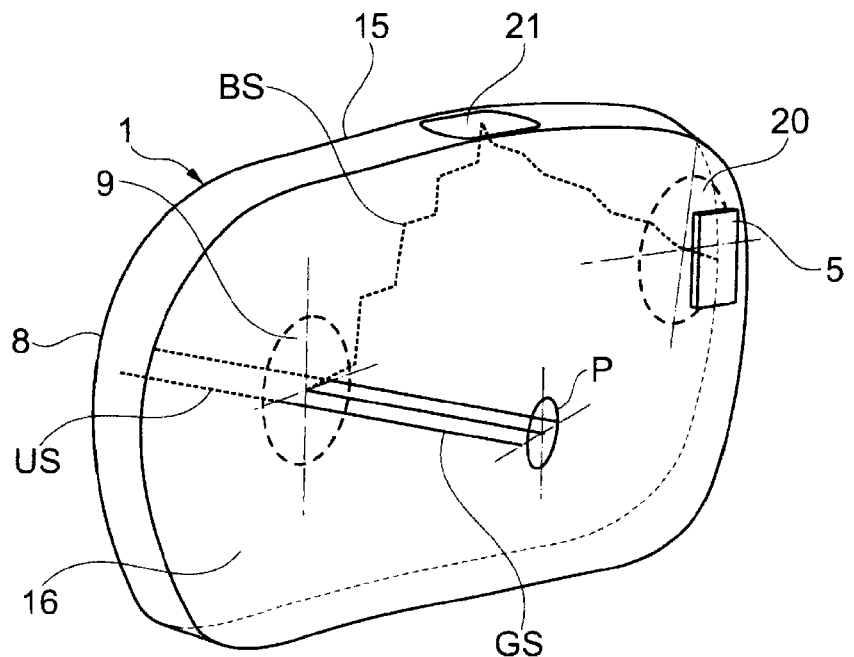
FIG. 20 is a perspective view of a further embodiment of the multifunction glass 1 from FIG. 1.

A variant of the multifunction glass from FIG. 19 is shown in FIG. 20. In this variant, instead of the mirror area 17, a further Fresnel surface 21 is formed which in principle has the same structure as the Fresnel surface 18. The alignment of the deflecting mirrors of the Fresnel surface 21 is merely chosen such that the deflection of the image ray beam BS shown in FIG. 20 takes place.

Figure 21:
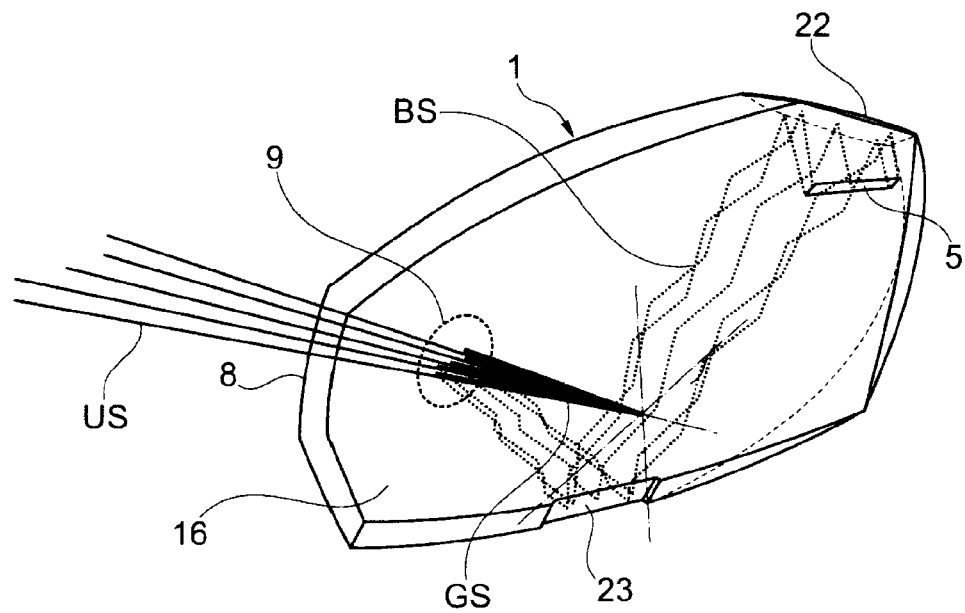
FIG. 21 is a perspective view of a further embodiment of the multifunction glass 1 from FIG. 1.

A further embodiment of the multifunction glass 1 is shown in FIG. 21. In this embodiment, the image ray beam BS from the imaging system 5 again enters the multifunction glass 1 from the back 16, is reflected at the upper rim at a first deflecting area 22 in the direction of a second deflecting area 23 at the lower rim of the multifunction glass 1, and reflected there in the direction of the superimposition area 9. The guiding in the multifunction glass 1 again takes place by means of total internal reflection at the front and back 8, 16 of the glass 1. The deflecting areas 22 and 23 can be formed as metallized areas, as Fresnel surfaces or also as areas in which the deflection takes place by means of total internal reflection.

Figure 22:
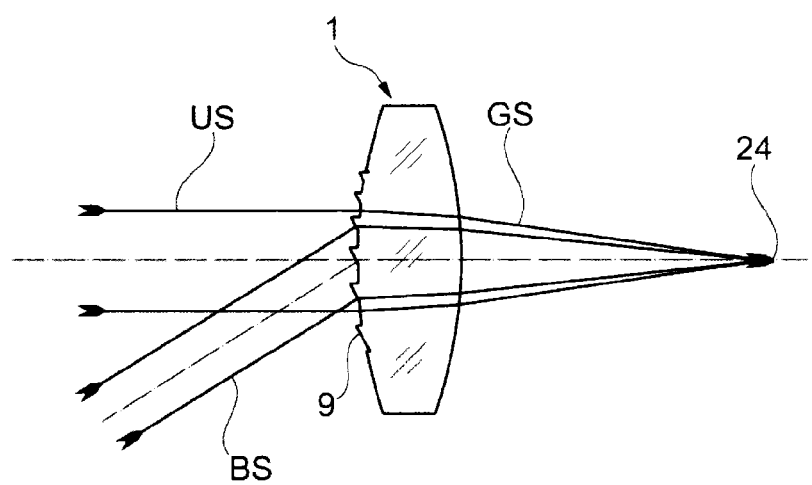
FIG. 22 depicts a further embodiment of the beam combiner 1 according to the invention.

In FIG. 22, a further embodiment of the beam combiner 1 according to the invention is shown in which the ray beams BS and US to be superimposed both strike the superimposition area 9 from the same side but at a different angle. As can be seen from the schematic representation in FIG. 22, the superimposition area 9 is formed such that both ray beams BS and US are focussed in the same focus 24.

Figure 23:
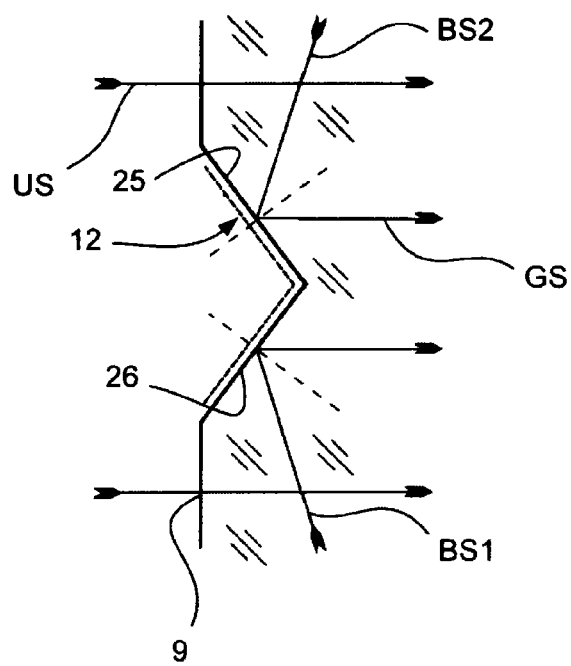
FIG. 23 is a development of the deflecting mirror 12 of the beam combiner according to the invention.

A development of the deflecting mirror 12 is shown in FIG. 23. In this development, the deflecting mirror 12 has two mirror edges 25 and 26 which are metallized. Thus, three ray beams can be superimposed with each other, namely two image ray beams BS1 and BS2 with the surrounding ray beam US, as can be seen in the schematic representation from FIG. 23. Deflecting mirrors 12 with the two mirror edges 25 and 26 can be arranged in the same manner as the already described deflecting mirrors 12 of the above embodiments.

Figure 24:
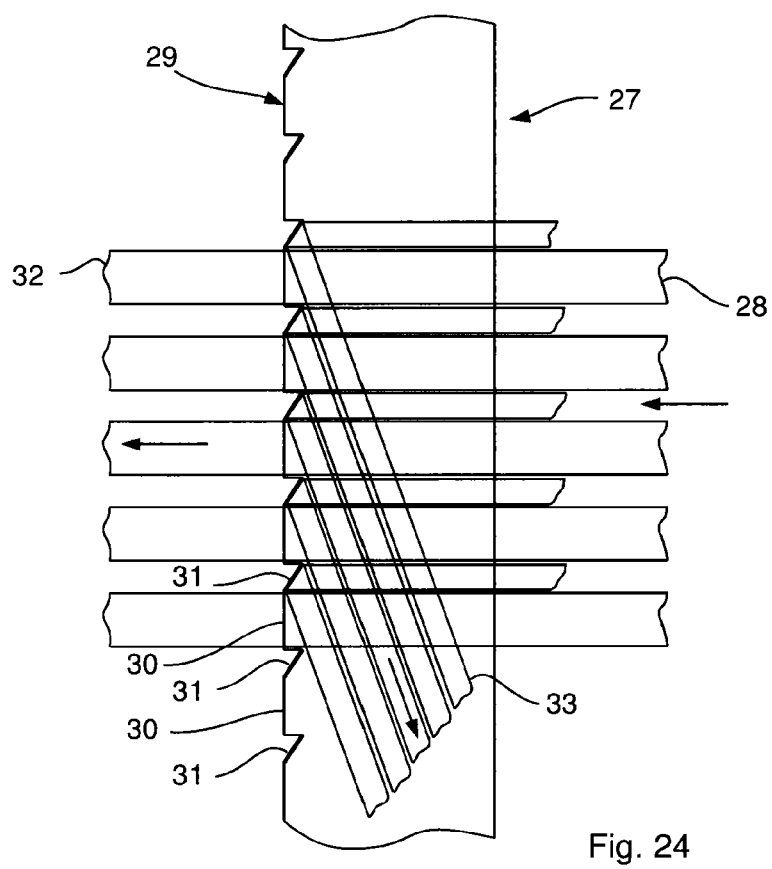
FIG. 24 is a schematic sectional view of a beam splitter 27 according to the invention.

The previously described beam combiner 1 according to the invention can also be used as a beam splitter 27. For this, the beam combiner 1 need merely be passed through in the opposite direction, thus e.g. in FIG. 3 impinged by a ray beam coming from the right. This is represented in FIG. 24, which shows the basic structure of such a beam splitter 27 which is essentially the same as the structure of the beam combiner. If an incident ray beam 28 strikes the beam combiner 27 (here from right to left) and passes through a division area 29, the part of the incident ray beam 27 which strikes the areas 30 (which correspond to the areas 13 in FIG. 3) of the division area 29 between the deflecting elements 31 (which correspond to the deflecting mirrors 12 in FIG. 3), is transmitted and forms a first ray beam 32. The part of the incident ray beam 27 which strikes the deflecting elements 31 is reflected by the latter and forms a second ray beam 33 which does not run parallel to the first ray beam 32. The deflecting elements 31 can be formed in the same manner as the deflecting elements 12 of the beam combiner 1.

Figure 25:
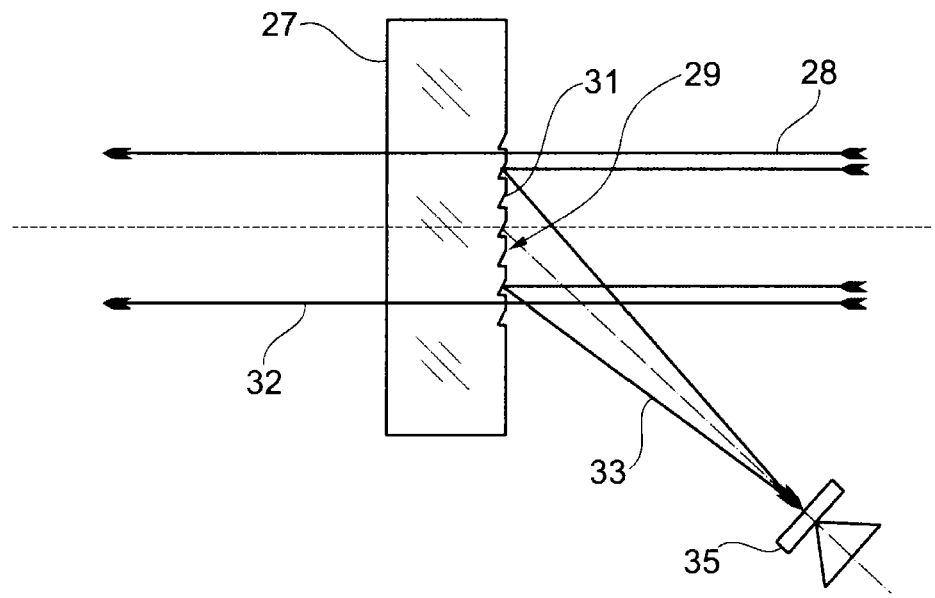
FIG. 25 is a variant of the beam splitter from FIG. 24.

In FIG. 25, a variant of the beam splitter 27 is shown in which the division area 29 is formed at the side which the incident ray beam 28 strikes. Furthermore, the deflecting elements 31 are formed and arranged such that the reflected part 27 is focussed onto a detector 35. In addition to the beam splitting, a beam focussing is thus also brought about.

Figure 26:
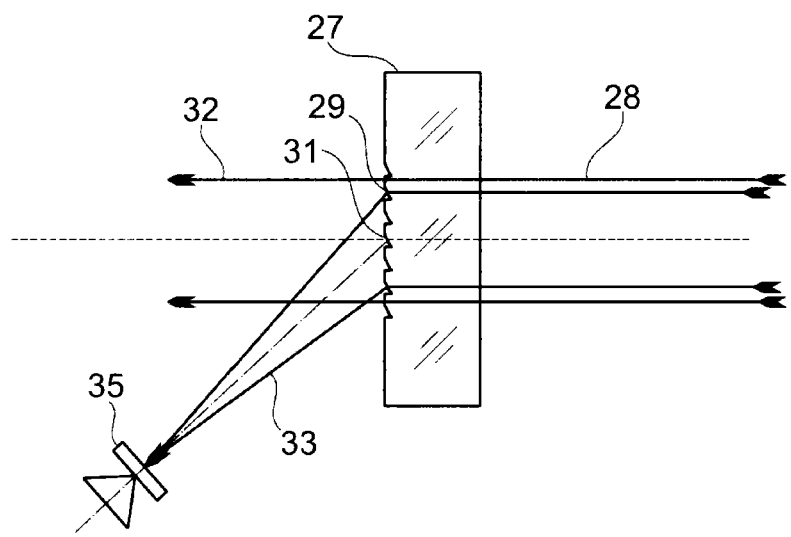
FIG. 26 is a further variant of the beam splitter from FIG. 24.

In FIG. 26, a variant of the beam splitter 27 from FIG. 25 is shown in which the division area 29 is formed on the side at which the incident ray beam 28 leaves the beam splitter 27 again. Also in this embodiment, a focussing of the second ray beam 33 onto a detector 35 is brought about by means of the deflecting elements 31 which here preferably function refractively.

The invention claimed is:

1. A beam combiner for combining a first ray beam with a second ray beam that does not run parallel to the first ray beam to form a common ray beam, the beam combiner comprising:
    a body that is transparent for the first ray beam and which has a superimposition area which the first ray beam strikes when passing through the body and wherein the superimposition area is divided into a first section and a second section, wherein only the first section, which is formed of a plurality of reflective and/or refractive deflecting elements spaced apart from each other, brings about a deflection of the second ray beam by reflection and/or refraction such that after leaving the body the first ray beam, combined with the deflected second ray beam, forms the common ray beam; and
    a coupling-in area via which the second ray beam is coupled into the beam combiner and then guided in the beam combiner to the superimposition area, wherein the coupling-in area is formed as a Fresnel surface which brings about a folding of the beam path.

2. A display device, comprising
    a beam combiner according to claim 1;
    an image-generating module; and
    a holding device fittable onto the head of a user and to which the beam combiner is attached such that when the holding device is fitted a user perceives the real surroundings through the superimposition area of the beam combiner;
    wherein the image-generating module generates an image and directs it as the second ray beam onto the superimposition area such that when the holding device is fitted onto the head the user can perceive the image superimposed on the real surroundings.

3. A display device comprising:
    a beam combiner for combining a first ray beam with a second ray beam that does not run parallel to the first ray beam to form a common ray beam, the beam combiner comprising a body and a coupling-in area, wherein the body is transparent for the first ray beam and has a superimposition area which the first ray beam strikes when passing through the body. wherein the second ray beam is coupled into the beam combiner by the coupling-in area, which is formed as a Fresnel surface which brings about a folding of the beam path, and then guided in the beam combiner to the superimposition area, wherein the superimposition area is divided into a first section and a second section, wherein only the first section, which is formed of a plurality of reflective and/or refractive deflecting elements spaced apart from each other, brings about a deflection of the second ray beam by reflection and/or refraction such that after leaving the body the first ray beam, combined with the deflected second ray beam, forms the common ray beam;
    an image-generating module; and
    a holding device that can be fitted onto the head of a user and to which the beam combiner is attached such that when the holding device is fitted the user's line of sight is directed through the superimposition area of the beam combiner, wherein the image-generating module generates an image and directs it as the second ray beam onto the superimposition area such that when the holding device is fitted onto the head the user can perceive the image superimposed on the real surroundings.

4. The display device according to claim 3, in which the first section has an imaging function for the second ray beam.

5. The display device according to claim 3, in which a surface of the first section, seen in top view onto the superimposition area, is 5 to 30% of a surface of the superimposition area.

6. The display device according to claim 3, in which the surface of the first section, seen in top view onto the superimposition area, is at least 50% of the surface of the superimposition area.

7. The display device according to claim 3, in which the deflecting elements are formed at a material boundary surface of the body.

8. The display device according to claim 7, in which the material boundary surface at which the deflecting elements are formed is curved.

9. The display device according to claim 3, in which each deflecting element is formed flat.

10. The display device according to claim 3, in which the deflecting elements are distributed irregularly in the superimposition area.

11. The display device according to claim 3, in which each deflecting element is formed polygonal.

12. The display device according to claim 3, in which the maximum extent of each deflecting element is up to 200 μm.

13. The display device according to claim 12, in which the maximum extent of each deflecting element lies in the range of 20-30 μm.

14. The display device according to claim 3, in which a part of the first ray beam which strikes the first section is screened and thus does not become part of the common ray beam.

15. The display device according to claim 3, in which the first section is formed as a discontinuous Fresnel structure.

16. The display device according to claim 3, in which the second ray beam is guided in the transparent body to the superimposition area.

17. The display device according to claim 3, in which the second section transmits the first ray beam.

18. The display device according to claim 3, in which the beam combiner has an imaging property for the second ray beam.

19. The display device according to claim 3, in which the Fresnel surface has an imaging property for the second ray beam.

20. The display device according to claim 3, in which the Fresnel surface is formed at a curved material boundary surface of the beam combiner.

21. A beam splitter for dividing an incident ray beam incident on the beam splitter into a first ray beam and a second ray beam that does not run parallel to the first ray beam, the beam splitter comprising:
- a body that is transparent for the incident ray beam and which has a division area which the incident ray beam strikes and which is divided into a first section with a plurality of reflective and/or refractive deflecting elements spaced apart from each other and a second section;
- wherein a first part of the incident ray beam transmitted by the division area forms the first ray beam and a second part of the incident ray beam deflected at the deflecting elements by reflection and/or refraction forms the second ray beam.

22. The beam splitter according to claim 21, in which the deflecting elements have an imaging function for the second ray beam.

23. The beam splitter according to claim 21, in which a surface of the first section, seen in top view onto the division area, is 5 to 30% of a surface of the division area.

24. The beam splitter according to claim 21, in which a surface of the first section, seen in top view onto the division area, is at least 50% of a surface of the division area.

25. The beam splitter according to claim 21, in which the deflecting elements are formed at a material boundary surface of the body.

26. The beam splitter according to claim 25, in which the material boundary surface at which the deflecting elements are formed is curved.

27. The beam splitter according to claim 21, in which each deflecting element is formed flat.

28. The beam splitter according to claim 21, in which the deflecting elements are distributed irregularly in the division area.

29. The beam splitter according to claim 21, in which each deflecting element is formed polygonal.

30. The beam splitter according to claim 21, in which the maximum extent of each deflecting element is up to 200 μm.

31. The beam splitter according to claim 30, in which the maximum extent of each deflecting element lies in the range of 20-30 μm.

32. The beam splitter according to claim 21, in which the first section is formed in the manner of a discontinuous Fresnel structure.

* * * * *